(12) United States Patent　　(10) Patent No.:　US 12,594,994 B2

Ramirez Ruiz　　(45) Date of Patent:　Apr. 7, 2026

(54) ROAD VEHICLE WITH SUSPENSION UNIT CONFIGURED TO CHANGE THE CAMBER ANGLE AND TOE ANGLE OF A FRONT WHEEL

(71) Applicant: FERRARI S.P.A., Modena (IT)

(72) Inventor: Isabel Ramirez Ruiz, Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 19/235,848

(22) Filed: Jun. 12, 2025

(65) Prior Publication Data

US 2025/0382009 A1　　Dec. 18, 2025

(30) Foreign Application Priority Data

Jun. 17, 2024　(IT) ........................ 102024000013825

(51) Int. Cl.
B62D 17/00　　(2006.01)
B60G 3/26　　(2006.01)
B62D 7/22　　(2006.01)

(52) U.S. Cl.
CPC .............. B62D 17/00 (2013.01); B60G 3/26 (2013.01); B62D 7/228 (2013.01)

(58) Field of Classification Search
CPC ...................... B60R 2022/287; B60R 22/4676
See application file for complete search history.

(56) References Cited

U.S. PATENT DOCUMENTS

| | | | |
|---|---|---|---|
| 5,438,515 A | 8/1995 | Miichi et al. | |
| 9,211,906 B2 | 12/2015 | Kageyama | |
| 11,511,581 B1 * | 11/2022 | Berardi | ................... B60G 3/20 |

FOREIGN PATENT DOCUMENTS

| | | | | |
|---|---|---|---|---|
| CN | 113260554 A * | 8/2021 | .............. | B60G 3/26 |
| DE | 102016005927 A1 * | 5/2017 | .............. | B60G 3/20 |
| DE | 102019117991 A1 | 1/2021 | | |
| DE | 102022102115 A1 * | 8/2023 | ............ | B60G 7/003 |
| EP | 1997715 A2 * | 12/2008 | ............ | B62D 7/159 |
| JP | 2007276752 A * | 10/2007 | | |
| JP | 2008007013 A * | 1/2008 | | |
| JP | 2008114832 A * | 5/2008 | | |
| JP | 2008137632 A * | 6/2008 | | |

(Continued)

OTHER PUBLICATIONS

Italian Search Report and Written Opinion in IT Application No. 202400013825, mailed Dec. 2, 2024, an English translation attached hereto (6 pages).

*Primary Examiner* — Nicole T Verley

(74) *Attorney, Agent, or Firm* — Leason Ellis LLP

(57)　　　　ABSTRACT

A road vehicle having a fixed chassis, two front wheels, and a suspension assembly provided for each front wheel positioned between the fixed chassis and the corresponding front wheel. Each suspension assembly comprises an upper lever and a rod. The upper lever comprises an active tie-rod configured to change the camber angle of the corresponding front wheel and the other rod is realised in the form of a fixed tie-rod configured to change the toe-in angle of the corresponding front wheel. The active camber tie-rod is a telescopic type tie-rod to vary its length. The active camber tie-rod and the fixed toe-in tie-rod being are coupled on one side to the chassis and on the other side to the wheel at such points of the space that activating the active tie-rod simultaneously modifies both the camber angle and the toe-in angle.

7 Claims, 4 Drawing Sheets

(56)　　　　　　　References Cited

FOREIGN PATENT DOCUMENTS

| | | | | |
|---|---|---|---|---|
| JP | 2008137633 | A | * | 6/2008 |
| JP | 2009241639 | A | * | 10/2009 |
| JP | 4868129 | B2 | * | 2/2012 |
| JP | 6030520 | B2 | * | 11/2016 | .............. B60G 3/26 |
| KR | 20200011210 | A | * | 2/2020 | ......... B60G 17/0162 |
| WO | WO-2018134689 | A2 | * | 7/2018 | ............. B60G 7/006 |

* cited by examiner

ROAD VEHICLE WITH SUSPENSION UNIT CONFIGURED TO CHANGE THE CAMBER ANGLE AND TOE ANGLE OF A FRONT WHEEL

CROSS REFERENCE TO RELATED PATENT APPLICATIONS

This patent application claims priority from Italian Patent Application no. 102024000013825 filed on Jun. 17, 2024, the content of which is incorporated herein by reference.

TECHNICAL FIELD OF THE INVENTION

The technical field covered by the present invention is the one related to road vehicles, in particular sports cars. In this context, the present invention addresses the problem of creating a suspension assembly configured to act on a front wheel in order to change not only the camber angle but also the toe angle reducing the number of active components in the assembly.

BACKGROUND ART

As is well known, the dynamics of a road vehicle, in particular of a car, is defined by three axes, namely a roll axis, a pitch axis, and a yaw axis. The roll axis identifies the forward direction of the vehicle, the yaw axis is an axis orthogonal to the plane in which the vehicle is moving forward (if the plane is horizontal, it corresponds to the gravity direction), and the pitch axis is an axis orthogonal to the two previous axes. As is well known, a road vehicle comprises a fixed chassis and four wheels. The wheels rest on the floor while the chassis is connected to the wheels by suspensions. It is known to provide a steering assembly for at least each front wheel, i.e. a set of elements placed between the fixed chassis and the corresponding front wheel configured to change the position of the wheel with respect to the chassis. In particular, it is necessary to be able to rotate the wheel along an axis parallel to the yaw axis (or vertical) so that an angle can be created between the wheel and the roll axis. This angle is known as the toe-in angle and it is the variation in this angle that allows the vehicle to run a curve. Steering units are known to be able to also change the angle of the wheel by rotating along an axis parallel to the roll axis. This rotation creates a misalignment between the wheel and the vertical yaw axis known as camber angle. This camber angle also contributes to the vehicle dynamics in a curve (an effect very much exploited in the cycling field). Nowadays, in order to vary the toe-in angle, there is provided a toe-in tie-rod connected, on one side, to the chassis and, on the other side, to an arm connected to the wheel, wherein this toe-in tie-rod is of the telescopic type (operated by the steering wheel of the vehicle). Nowadays, a possible active variation of the camber angle is to provide a camber tie rod connected, on one side, to the chassis and, on the other side, to an arm connected to the wheel, wherein this camber tie rod is also of the telescopic type. The operation of this camber tie-rod is managed by a special electronic control.

Based on this prior art, the aim of the present invention is to make available an innovative active camber unit capable of changing not only the camber angle but also the toe-in angle, wherein this unit is an alternative to the prior art and has fewer active elements.

OBJECT AND SUMMARY OF THE INVENTION

According to the present invention, an innovative camber unit for a road vehicle is therefore proposed. Thus the starting point of the present invention is a road vehicle having a roll axis X, a pitch axis Y, and a yaw axis Z. The person skilled in the art is well acquainted with these angles. The vehicle comprises a fixed chassis and two front wheels. For each front wheel there is a suspension assembly that connects the fixed chassis to the corresponding front wheel. Each of these suspension assemblies comprises an upper rod and lever and two lower rods connected on one side to the fixed chassis and on the other side to the wheel hub carrier (schematised in the figures as 4 arms connected in the centre of the wheel). According to the main aspect of the present invention, only the upper suspension lever is realised in the form of an active tie-rod of a telescopic type capable of varying its length, the other upper rod is realised in the form of a fixed-length tie-rod. As will also be shown in the example shown in the figures, according to the present invention the active tie-rod can be defined as a camber tie-rod because, by varying its length, the camber angle of the wheel varies. The other fixed tie-rod can be defined a toe-in tie-rod because as the camber angle changes, it also imposes a toe-in angle on the wheel. Thus, activating the camber tie-rod to modify the camber angle also automatically causes a corresponding change in the toe-in angle. Depending on the design required, by varying the positions in space of the coupling points of the upper lever and rod of the suspension with respect to the chassis and wheel, different ratios of toe-in angles and camber angles can be achieved for the same camber angle imposed by the active lever.

Further features of the present invention are defined by the attached dependent claims.

BRIEF DESCRIPTION OF THE DRAWINGS

To better understand the present invention, a preferred embodiment thereof will be now described, for merely exemplary and non-limiting purposes, with reference to the appended drawings, wherein:

in FIGS. 6 and 7, it can be seen how an imposed camber angle generates a consequent toe-in angle.

PREFERRED EMBODIMENTS OF THE INVENTION

Figure 1:
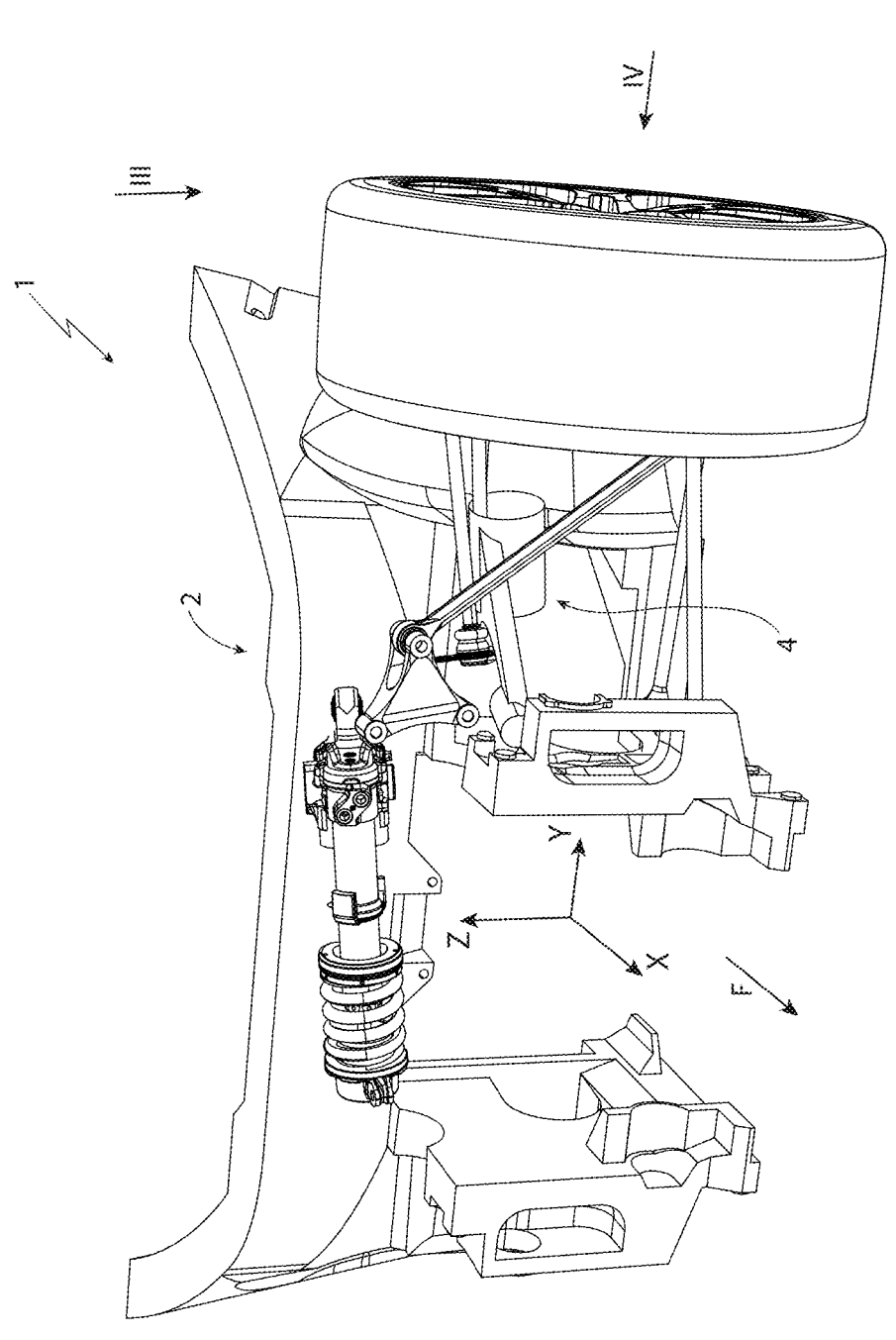
FIG. 1 is a schematic view of the components of a vehicle which contribute to the present invention, the remaining vehicle components have not been shown for clarity purposes.

FIG. 1 is a schematic view of the components of a vehicle that contribute to an embodiment of the present invention. The remaining vehicle components have not been shown for clarity purposes. In particular, FIG. 1 shows a vehicle 1 with a fixed chassis 2 and a front wheel 3. Like any road vehicle, the mechanics of vehicle 1 is defined by three axes X, Y, Z passing through its centre of gravity and known as roll X, pitch Y and yaw Z axes. The person skilled in the art knows these axes well. Reference 4 in FIG. 1 identifies a suspension assembly of the front wheel 3 with an upper lever and rod and two lower rods with respect to the centre of the wheel. The arrow F indicates the forward direction (opposite to the reverse one). The arrows referred to as III and IV identify the directions of observation of FIGS. 3 and 4.

Figure 2:
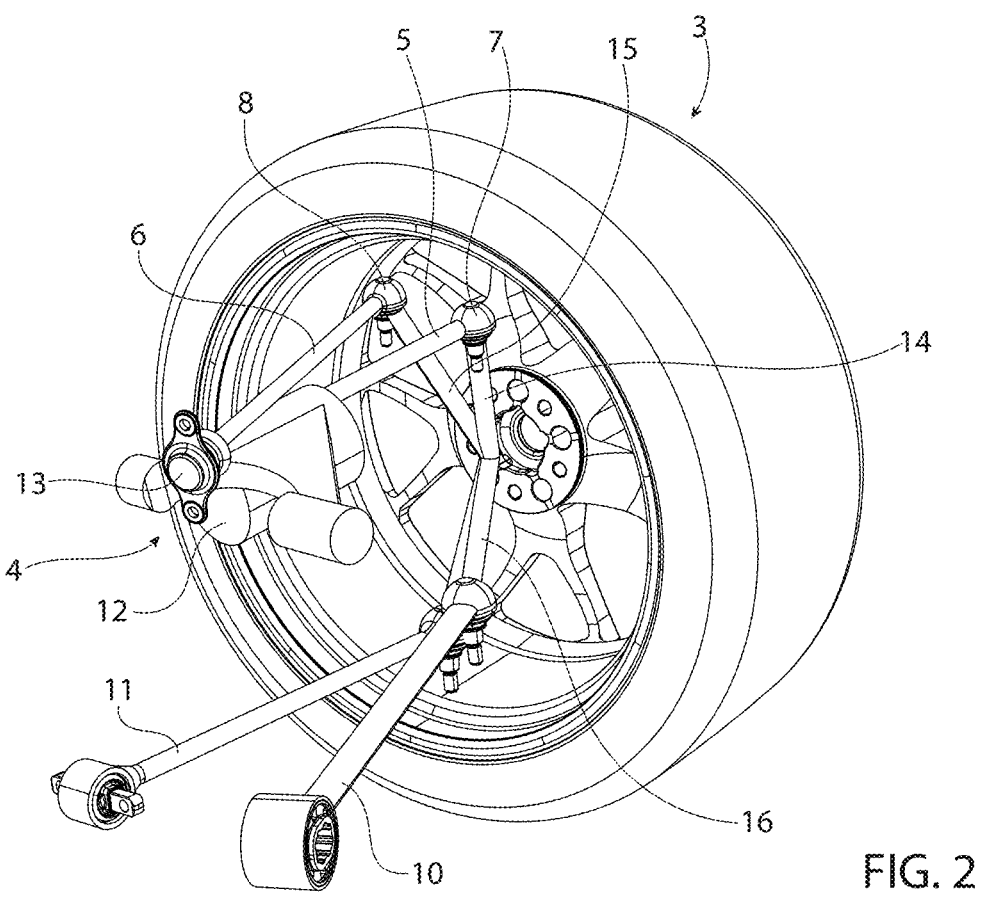
FIG. 2 is a view of the wheel of FIG. 1 with a corresponding suspension assembly according to the present invention.

FIG. 2 is a view of the wheel 3 of FIG. 1 with a corresponding suspension assembly 4. This suspension assembly 4 according to the present invention comprises an upper lever 5 and an upper rod 6 and two lower rods 10 11. The upper lever is realised in the form of an active tie-rod 5, configured to change the camber angle of the front wheel 3. The remaining upper rod 6 is a fixed tie rod 6, configured to change the toe-in angle of the corresponding front wheel 3 during activation of the active tie-rod 5. Thus only the camber tie-rod 5 is an active telescopic-type tie-rod to vary its length between the ends 7 12 (perpendicular to the rotation axis connecting the lever 5 to the chassis), while the toe-in tie-rod 6 is a fixed length tie-rod between the ends 8 13. The toc-in 6 and camber 5 tie-rods are coupled on one side to the chassis 2 (ends of the two connecting points of the lever and 13) and on the other side (ends 7 and 8) to the hub carrier integral with the wheel, schematised with the arms 14 15 connected to the centre 9 of the wheel. According to the general definition of the present invention, the attachment points of the aforementioned toe-in tie-rods 6 and camber tie-rods 5 with respect to the chassis 2 and with respect to wheel 3 are such that operating the camber tic-rod 5 generates a camber angle and the fixed tie-rod 6 correspondingly generates a toe-in angle.

Figure 3:
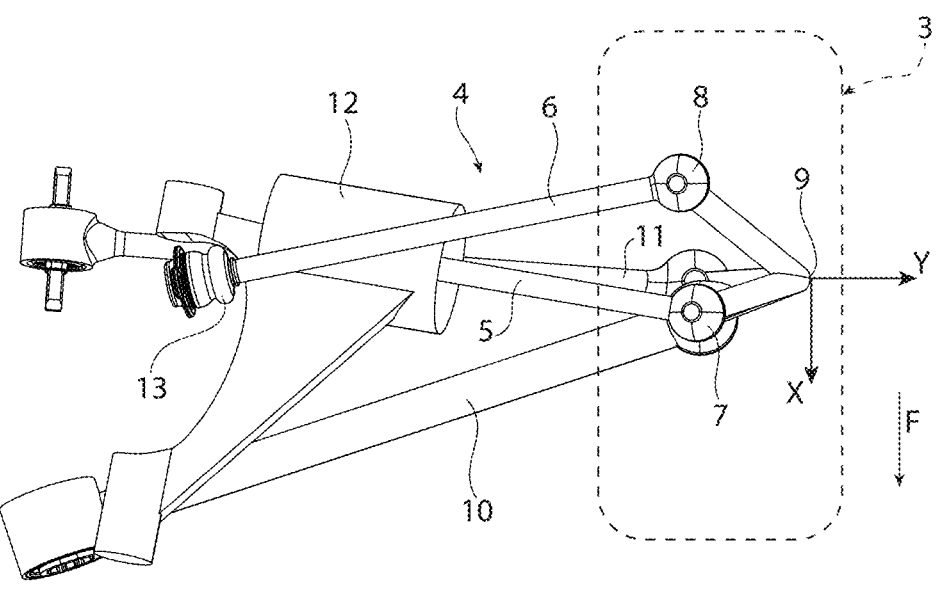
FIG. 3 is a view from above (along the yaw axis X) of the suspension assembly in FIG. 2 wherein the wheel is shown transparent for clarity purposes.
Figure 4:
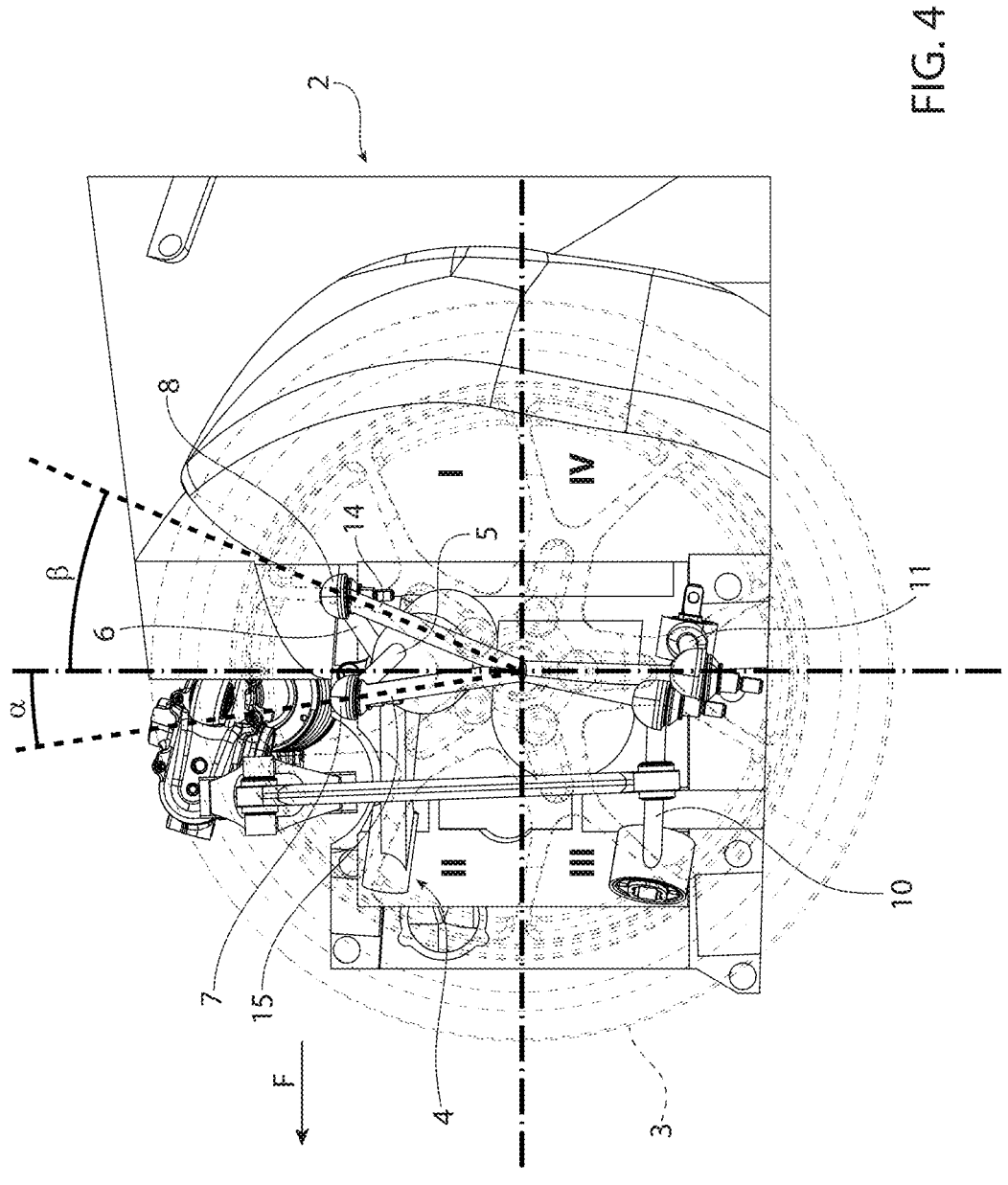
FIG. 4 is a side view (along the pitch axis Y from the outside towards the centre in the vehicle) of the suspension assembly in FIG. 2 wherein the wheel is shown transparent for clarity purposes.

FIGS. 3 and 4 are respectively a view from above (along the yaw axis X) and a side view (along the pitch axis Y) of the suspension assembly of FIG. 2 along the arrows indicated with III and IV in FIG. 2 in which the wheel is shown transparently for clarity. These figures make it possible to clarify how in this example the attachment points 8 and 7 of the upper lever 5 and of the upper rod 6 are spatially arranged with respect to the wheel hub carrier schematised with suspension arms centred in the centre of the wheel. In this example, it can be noted that in the null toe-in and camber angle configuration, the wheel end 7 of the lever with the active camber tic-rod 5 is in a more external position than the wheel end 8 of the fixed toe-in tie-rod 6 along the direction parallel to the pitch axis Y or are substantially aligned. FIG. 3 also makes it possible to see that in this example the end 7 of the active camber lever or tie rod 5 is beyond the wheel centre along the forward direction F, while the wheel end 8 of the fixed toe-in tie-rod 6 is behind the wheel centre along the forward direction F. Furthermore, the inner end 13 of the fixed toe-in tie-rod 6 in this example is substantially aligned with the wheel centre along the axis Y.

In FIG. 4 it can be noted that in the null toe-in and camber angle configuration the wheel end 7 of the lever with the active camber tie-rod 5 is in a more forward position than the wheel end 8 of the toe-in tie-rod 6 along the direction parallel to the roll axis X. In particular, dividing the wheel into 4 quarters (indicated in FIG. 4 with I-II-III-IV) looking at the wheel from the outside of the vehicle along direction Y, the wheel end 7 of the active camber tie-rod 5 is in quarter II (top left with respect to the centre of the wheel from the forward side F) while the end 8 of the toe-in tie-rod 6 is in quarter I (top right with respect to the centre of the wheel from the forward side F). With respect to the vertical Z passing through the wheel centre, points 7 and 8 identify, in their respective quarters II and I, alpha and beta angles on opposite sides between 0°-10° and 10°-25° respectively. In this example, in the null toe-in and camber angle configuration, the wheel end 8 of the toe-in tie rod 6 is at a higher position than the wheel end 7 of the camber tie-rod 5 along the direction parallel to yaw axis Z, or they are both at substantially the same height. As visible, both wheel ends 7, 8 of the tie-rods 5, 6 are positioned above the centre 9 of the wheel 3 in quarters II and I.

Figure 5:
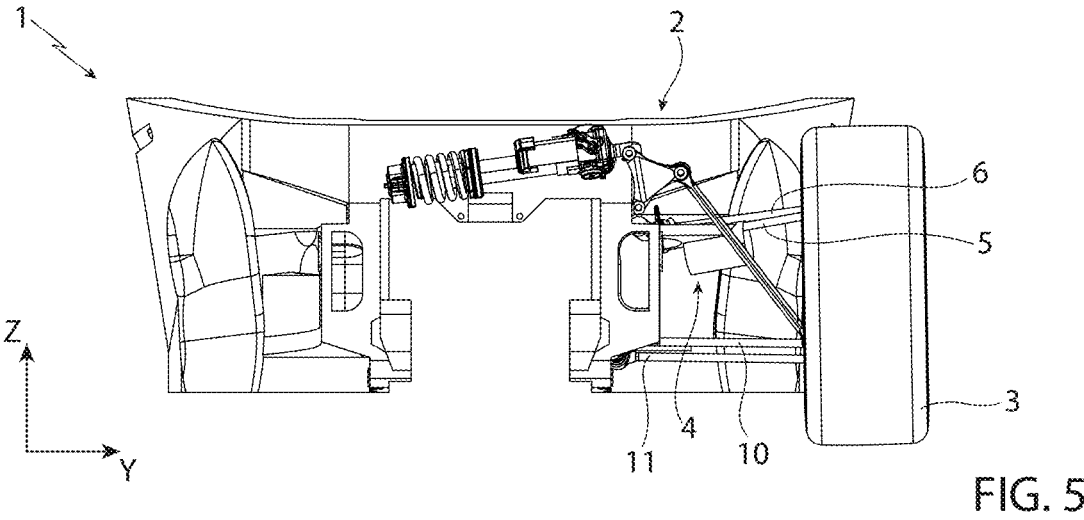
FIGS. 5-7 show different wheel positions achieved by operating the camber tie-rod (the only active lever of the suspension assembly) from the neutral configuration.
Figure 6:
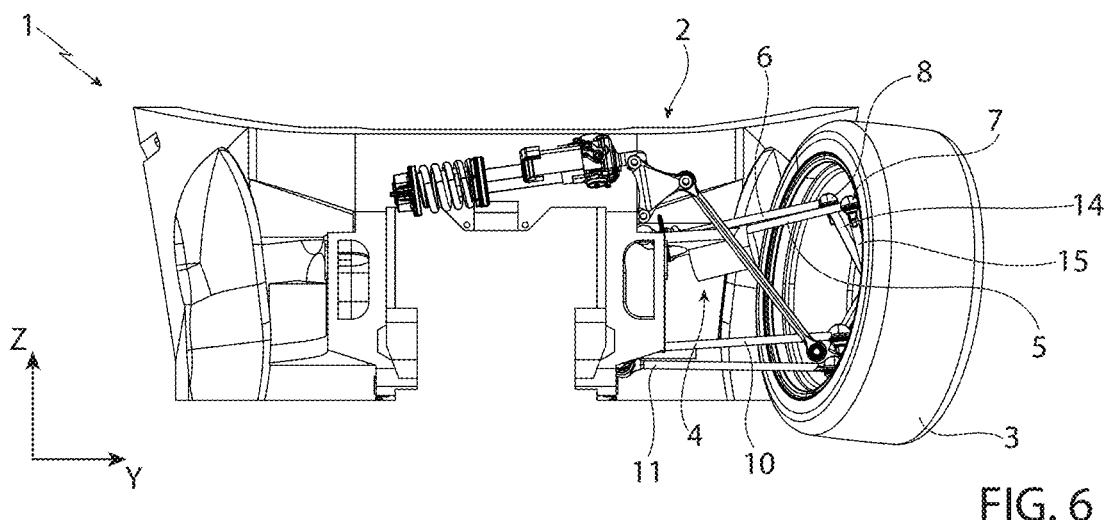
Figure 7:
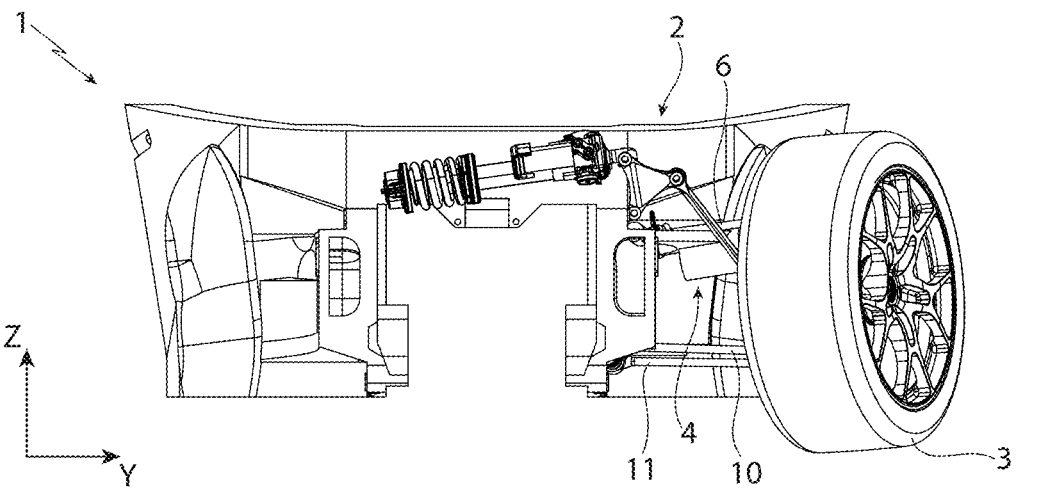

Finally, FIGS. 5-7 show different wheel positions achieved by operating the camber tie-rod 5 (the only active tie-rod in the unit) from the neutral configuration. In FIGS. 6 and 7, it can be noted that an imposed camber angle generates a resulting toe-in angle.

It is clear that changes and variations can be made to the embodiment just described and shown herein without thereby departing from the scope of protection of the present invention, as defined in the appended claims.

The invention claimed is:

1. Road vehicle having a roll axis, a pitch axis, and a yaw axis and comprising a fixed chassis, two front wheels; wherein each front wheel is provided with a suspension assembly positioned between the fixed chassis and the corresponding front wheel, where in each suspension assembly comprises an upper lever and a rod, wherein the upper lever is realized in the form of an active tie rod configured to change a the camber angle of the corresponding front wheel and the rod is realized in the form of a fixed tie rod configured to change the a toe-in angle of the corresponding front wheel; in which the active camber tie rod is a telescopic type rod, in order to vary its length, the active camber tie rod and the fixed tie toe-in rod being coupled on one side to the chassis and on the other side to the front wheel at such points of the space that activating the active tie rod simultaneously modifies both the camber angle and the toe-in angle.

2. Road vehicle as claimed in claim 1, wherein the active camber tie rod and the fixed toe tie rod respectively comprise wheel ends connected to a the hub carrier; wherein in a the null toe-in and camber angle configuration the wheel end of the fixed tie camber tie rod is in an outermost position of the wheel end of the fixed tie toe-in tie rod along the direction parallel to the pitch axis or are substantially aligned.

3. Road vehicle as claimed in claim 2, wherein in the null zero toe-in and camber angle configuration the wheel end of the active camber tie rod is in a more forward position than the wheel end of the fixed toe tie rod along the direction parallel to a roll axis.

4. Road vehicle as claimed in claim 3, wherein along the direction parallel to the roll axis the wheel ends of the active and fixed tie rods are on opposite sides with respect to a centre of the front wheel, wherein the wheel end of the active camber tie rod is downstream of the centre of the front wheel and the wheel end of the fixed toe-in tie rod is upstream of the centre of the wheel; where both wheel ends are above the centre of the front wheel.

5. Road vehicle as claimed in claim 4, wherein in the null toe-in and camber angle configuration the wheel-side attachment points of the active camber tie rod and the fixed toe tie rod identify angles on opposite sides with respect to the vertical passing through the wheel centre between 0°-10° and between 10°-25°.

6. Road vehicle as claimed in claim 4, wherein in the null toe-in and camber angle configuration the wheel end of the fixed toe-in tie rod is in a higher position than the wheel end of the active camber tie rod along the direction parallel to the yaw axis or are substantially aligned along the pitch direction.

7. Road vehicle as claimed in claim 1, wherein arranging the wheel ends of the active and fixed tie rods in such a way as to obtain a toe-in angle to camber angle ratio ranging from a minimum of −3 to a maximum of −5.5, performing toe-in and camber angles of opposite sign.

\* \* \* \* \*